UNITED STATES PATENT OFFICE.

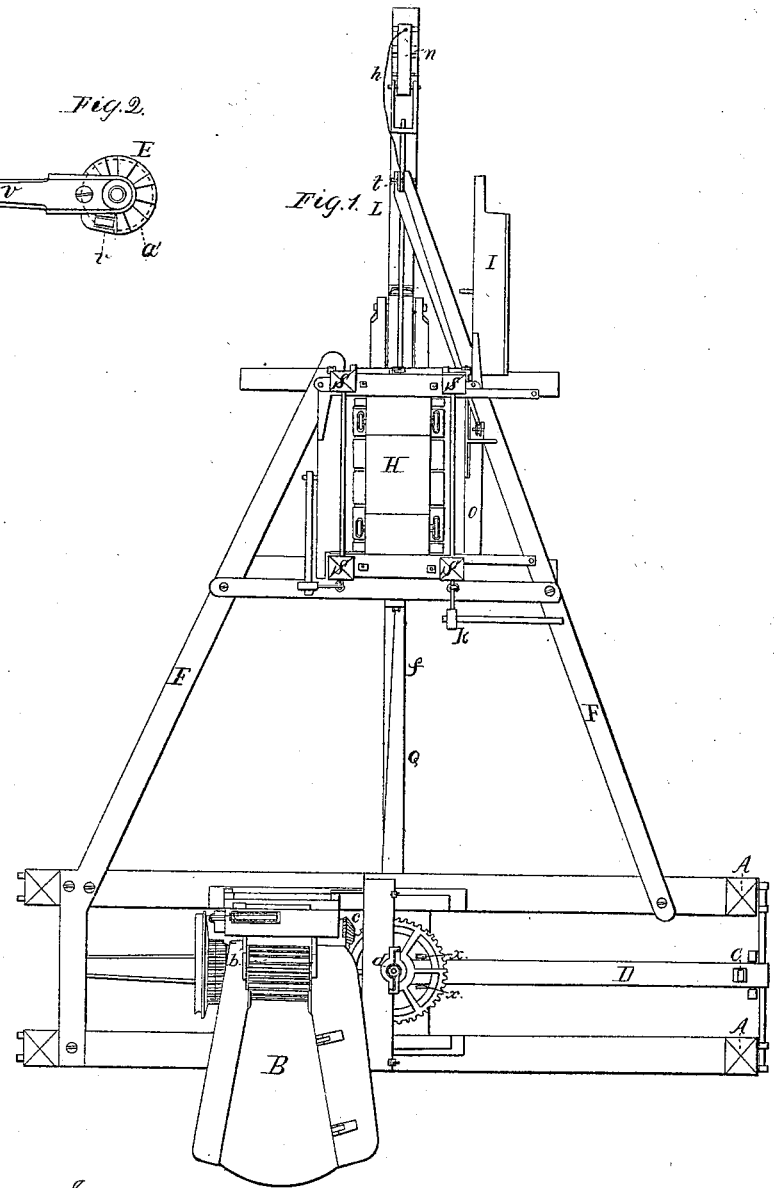

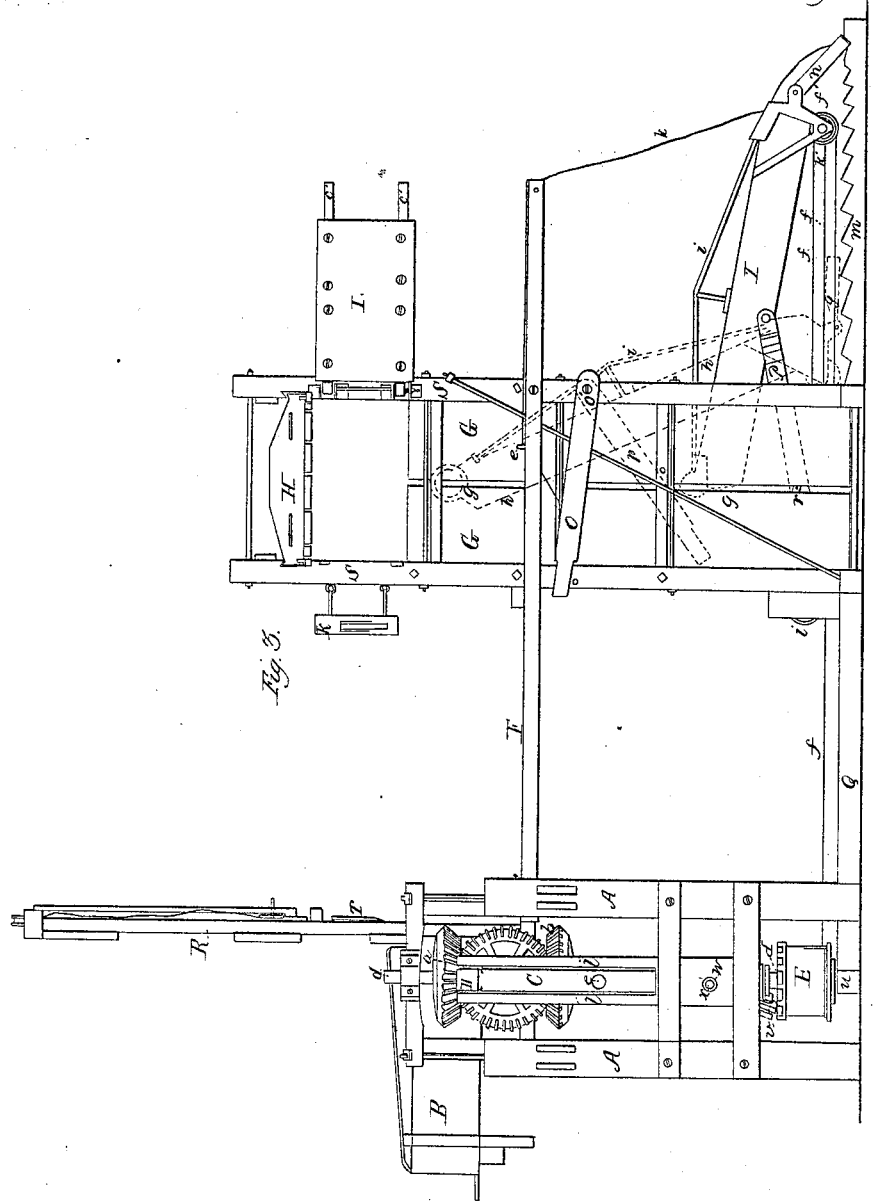

CHAS. WASTE AND ORSON WASTE, OF CAMERON, ILLINOIS.

IMPROVEMENT IN CRUSHING AND PRESSING MACHINES.

Specification forming part of Letters Patent No. 43,054, dated June 7, 1864.

*To all whom it may concern:*

Be it known that we, CHARLES WASTE and ORSON WASTE, of Cameron, in the county of Warren and State of Illinois, have invented a new and useful Improvement in Machines for Crushing and Pressing Hay and other Similar Material into Bales; and we do hereby declare that the following is a full and exact description thereof, reference being had to the accompanying drawings, and to the letters of reference marked thereon.

The nature and object of our invention consist in constructing a machine for crushing and pressing hay and other similar material, which embraces in its construction two rollers suitably and properly located, through which the hay is first passed, preparatory to pressing it into bales, by which the tubular stems are crushed, and a vertical press in which is pressed into bales the hay or material delivered from the rollers, so combining and arranging the operative parts that all are worked or driven by the same power at the same time, or each is driven separately and alone at the will of the operator.

It also consists in providing a means whereby the follower can be secured at any height.

The drawings are made upon two sheets, which are designated as Sheet 1 and Sheet 2. Sheet 1 represents a side view. Figure 1, Sheet 2, represents a top view; and Fig. 2, Sheet 2, is a top view of the drum, showing the dog, the ratchet, and a portion of the lever through which the power is applied.

In the different drawings similar letters refer to similar parts.

A A, Sheet 1, are posts of the frame, sustaining that part of the machine which does the crushing preparatory to the final pressing into bales.

B is the feed-box, in which the hay or material is placed previous to its reaching the rollers.

D is a lever extending from the upright shaft $d\ d$ to a point intermediate the posts A A, with one end working in the space between the standards $l\ l$, and the other end loosely attached to the upright shaft $d\ d$. It is more distinctly shown in Fig. 1, Sheet 2. This lever D, where it is loosely attached to the upright shaft $d\ d$, works between two shoulders, which are firmly attached to the said upright shaft. It also plays upon a fulcrum, $x\ x$. (Shown on Sheet 2, Fig. 1.)

C is a perpendicular arm or handle, attached, with a yielding joint, to the lever D, and serves the purpose of raising and lowering the lever D when desired.

$e$ is a hole in the handle C. There are three of them situated at suitable distances apart. (Not shown in the drawings.)

$w$ is a pin in the frame, upon which the handle C is fastened by means of the hole $e$, and the others not shown in the drawings.

$d\ d$ is an upright shaft passing from below the drum up to the top of the feed-box B, and properly working in boxes.

$a'$ is a ratchet-wheel located upon and is a part of of the drum E.

E is a drum playing loosely on the shaft $d\ d$, and situated at the lower end of said shaft.

$a$ and $b$ are two beveled cog-wheels firmly attached to the upright shaft $d\ d$, and directly facing each other.

$c$ is a bevel-wheel playing between the two beveled cog-wheels $a$ and $b$, and perpendicular to them, and arranged to mesh or match with them.

T is a knife, which is elevated by a rope passing over a pulley located above said knife, and over a cam attached to the shaft of the lower of the two pressure-rollers, and thus, by the revolution of this cam, the knife is made to descend periodically, cutting the crushed hay into sheets of sufficient length to fit into the press-box. This bevel cog-wheel $c$ is attached to the lower of the two pressure-rollers.

$s\ s$ G G constitute the pressing-box, in which the crushed hay is placed for final pressing.

F is a beam extending from the crushing part to the pressing-box and beyond it to the point $t$. There is one of a similar nature on the opposite side, but extending only to the pressing-box. The office and object of these two beams is to support and hold together the two parts comprising the machine, and at the same time furnish a proper foundation for a floor or a table to receive the crushed hay from the rollers. On this floor located on the beams F F a workman stands, and with a proper tool takes the crushed hay delivered from the pressure-rollers in sheets, and places it in the press-box.

Q is also a beam extending from the foot of the upright shaft $d\ d$ to the pressing-box. At the foot of the shaft there is placed a short beam at a right angle to the beam Q. The end of this beam is shown at $u$.

H is the head-piece of the pressing-box. This piece is removed by sliding it to one side to enable the bale, after being pressed and bound, to be removed.

I is a door attached to the post $s$, with hinges upon which it swings.

K is a catch hung by hinges on the side of the post, perpendicular to the side against which the door I comes when closed. There are two doors—one on the opposite side, similar to the door I.

L is the traveling beam, which presses the hay upwardly in the pressing-box to its final position in a compact form.

P is a movable fulcrum, upon which the traveling beam L operates. There is one on the opposite side similar to this.

$r$ is the point at which the movable fulcrum P is loosely attached.

M is a ratchet-beam, placed on a line with the beam Q produced.

N is a dog loosely fastened at the lower end of the traveling beam L, and working on the ratchet-beam M.

$k$ is a cord extending from the extreme end of the dog N up over a pulley, $t$, thence over another pulley at $e'$, and attached to the lever O.

O is a lever loosely attached at $o'$.

$i$ is a supporting-rod placed on the traveling beam L.

$f\ f\ f$ is a rope, one end starting from the drum E, passing over the pulleys $f'$ and $t'$, and fastened by the other end at $k'$.

$v$, Sheet 1, is a dog attached to the lever V, through which the power passes from the lever V to the ratchet-drum E, and this dog is connected with or disconnected from the drum E at the will of the operator. When the dog $v$ is turned so as to come in contact with the ratchet $a'$ on the drum, the drum then turns in common with the shaft.

The operation of our machine is as follows: Power being applied to the lever V, the shaft $d\ d$ is turned, and the two beveled cog-wheels $a$ and $b$ being fastened to the shaft, they also are set in motion. The wheels $a$ and $b$ do not both mesh into the vertical wheel $c$ at the same time. They are located sufficiently far apart that, if desired, they both will revolve, and neither will mesh into the vertical wheel $c$. When it is desired to mesh this vertical wheel so as to operate the pressure-rollers with the lower wheel, $b$, the handle C is lowered or pulled down so as to insert the pin $w$ into the hole $e$, thus also lowering the outer end of the lever D and raising the shaft $d\ d$, and the lower wheel is made to mesh with the vertical wheel $c$. The shaft $d\ d$ is capable of being raised or lowered at pleasure by means of the handle C and lever D. By raising the handle C and lever D the wheel $a$ is lowered and made to mesh into the vertical wheel $c$. When the dog $v$ is turned so as to come in contact with the drum-ratchet $a'$, the drum E revolves, the cord $f$ is wound around it, and passing over the pulleys $f'$ and $t'$, the power is greatly increased, the end of the traveling lever at $f'$ is drawn toward the pressing-box, while the other end is urged upwardly in a perpendicular line, guided by the guides $g'$, working in the slots shown in the drawings, and the hay which has been previously placed in the pressing-box is thus pressed sufficiently compact. The dog N passes over the ratchet-beam M, and, when desired, holds the traveling beam L at any desired point. When it is desired to lift the dog N, the lever O is allowed to fall in the position shown by the red lines $p$. Thus the dog N is raised. Before the traveling beam L begins to move, and after the hay has been placed in the pressing-box, the head H is shoved to its proper position, the doors I I are closed, and the catch K is swung to its proper position over the arms $c'\ c'$ of the door, thus securing a perfect resistance against the lateral pressure of the hay, which, as the traveling beam nears a perpendicular, is very heavy. The process of crushing and pressing, it will be discovered, can be carried on at one and the same time. By placing the dog $v$ so that it will catch in the ratchet $a'$, and lowering the handle C and lever D, the lower cog-wheel, $b$, meshes with the vertical cog-wheel $c$, and at the same time the traveling beam L is compressing the hay into a bale in the press-box. When the bale is sufficiently compressed, the lever O having been raised, the dog N is dropped, and the elevation thus obtained is secured. By unloosening the dog $v$, reversing the motion of the upright shaft, and raising the handle C and lever D so as to mesh the cog-wheel $a$ with the vertical cog-wheel $c$, the upright wheel $c$ continues to revolve in the same direction, and the traveling beam L descends gradually to a horizontal position, while at the same time the crushed hay for a new bale is being placed into the pressing-box. If, when the traveling beam L is ascending, it is discovered that more power is necessary in order to complete the pressing of the bale now under process of pressing, the handle C and the lever D are so adjusted as that the middle hole in the handle C is placed on the pin $w$, thus disconnecting the bevel cog-wheels $a$ and $b$ from the upright or vertical cog-wheel $c$, and the process of crushing for the time being is suspended and the entire power is applied to the pressing. When the hay has been placed in the feed-box B, it is then fed through the pressure-roller $b'$, Fig. 1, Sheet 2, and one located immediately below it.

Having thus described our invention, what we claim as new, and desire to secure by Letters Patent, is—

1. Combining a hay-crushing machine with a hay-press, both constructed and arranged as described, the operative parts of the crushing-machine so constructed that the hay is crushed, cut in sheets of proper size, and pressed into bales at the same time and with the same power.

2. So constructing and arranging the operative parts of our combined crushing and pressing machine that while the traveling beam L is reversed the revolving of the crushing-rollers remains unchanged, in the manner described.

3. So arranging the various parts of our combined pressing and crushing machine that the traveling beam L may remain stationary while the revolving of the pressure-rollers remains the same, in the manner described.

CHARLES WASTE.
     ORSON WASTE.

Witnesses:
 DANIEL GOODWIN, Jr.,
 JAMES A. COWLES.